United States Patent [19]

Brown et al.

[11] 4,356,739

[45] Nov. 2, 1982

[54] CONTROL ROD HANDLE

[75] Inventors: Warner K. Brown; Robert L. Kirby, both of Battle Creek, Mich.

[73] Assignee: Clark Equipment Company, Buchanan, Mich.

[21] Appl. No.: 136,198

[22] Filed: Apr. 1, 1980

[51] Int. Cl.³ .............................. G05G 1/02; E05B 3/04
[52] U.S. Cl. ...................................... 74/548; 292/350; 403/361; 403/379; 16/121
[58] Field of Search .................... 74/548; 16/118, 121; 292/348, 350; 403/361, 378, 379

[56] References Cited

U.S. PATENT DOCUMENTS

| 745,568 | 12/1903 | Caley | 403/378 |
| 909,035 | 1/1909 | Stuart | 292/348 |
| 1,150,114 | 8/1915 | Hays | 403/379 |
| 1,878,569 | 9/1932 | Zolleis . | |
| 1,974,464 | 9/1934 | Leins . | |
| 2,007,555 | 7/1935 | Wiltshire, Jr. | 40/8 |
| 2,607,616 | 8/1952 | Davidson . | |
| 3,301,580 | 1/1967 | Greitzer . | |
| 3,383,944 | 5/1968 | Skinner . | |

FOREIGN PATENT DOCUMENTS 20223  11/1904  Sweden .............................. 403/378

Primary Examiner—Kenneth Dorner
Attorney, Agent, or Firm—Mack L. Thomas

[57] ABSTRACT

A handle preferably in the shape of an inverted frusto-pyramid is attached to the extremity of a control rod which is received in a longitudinal bore in the handle. The control rod has a transverse opening in its extremity that can be aligned with a transverse bore in the handle that intersects with the longitudinal bore. A bolt is insertable through the transverse bore and aligned transverse opening. The bolt has a bolthead portion and a threaded end portion. The threaded end of the bolt may be placed in mating engagement with internal threads of a nut to secure the handle to the control rod.

11 Claims, 6 Drawing Figures

CONTROL ROD HANDLE

BACKGROUND OF THE INVENTION

1. Field of the Invention

This invention pertains to handles for control rods of various configurations to serve numerous functions such as gear shift selection, valve actuation, attachment operation, and other numerous analogous applications which would be readily suggested to one skilled in the art.

2. Description of the Prior Art

Various types of handle mountings for control rods include a longitudinal bore in a spherical knob which receives the extremity of a control rod and is secured to the extremity by the engagement of mating threads in the extremity to those in the longitudinal bore, or by gluing the knob onto the control rod or some other equivalent method. Obvious advantages in these types of mountings are their simplicity and ease of installation. The above attachment mountings are intended to be permanent. However, the knobs can usually be removed by applying sufficient twisting or pulling force. Control rod manipulation without a knob is awkward and uncomfortable and replacement knobs are costly. Moreover, some conventional knob mountings allow the knob over a period of time to become loose on the control rod but do not provide a quick and practical method and apparatus to retighten the knob to the rod.

SUMMARY OF THE INVENTION

This invention provides a simple mounting for a handle to a control rod retaining the above-discussed advantages of prior art knob mounting, but is not subject to removal solely by a twisting or pulling force. Additionally the handle mounting is adjustable to take up looseness due to wear and is designed to comfortably conform to the operator's hand.

The knob utilzing the present invention is provided with a transverse bore intersecting the conventional longitudinal bore. A transverse opening is provided near the extremity of the control rod. When the extremity of the control rod is inserted in the longitudinal bore of the handle, the transverse opening in the extremity of the control rod is in alignment with the transverse bore of the handle. A bolt having a bolthead at one end and external threads at the other end can then be inserted through the transverse bore and aligned transverse opening. The threaded end of the bolt receives an internally threaded nut held against the opposite side of the handle or preferably in the end of the transverse bore spaced from the bolthead for securing and retightening the handle to the control rod.

Preferably the outer bolthead surface has a recessed polygonal cavity. This makes vandalism more difficult since an Allen wrench or the like must be used to attach and remove the handle from the control rod.

DETAILED DESCRIPTION OF THE PREFERRED EMBODIMENT

Figure 1:
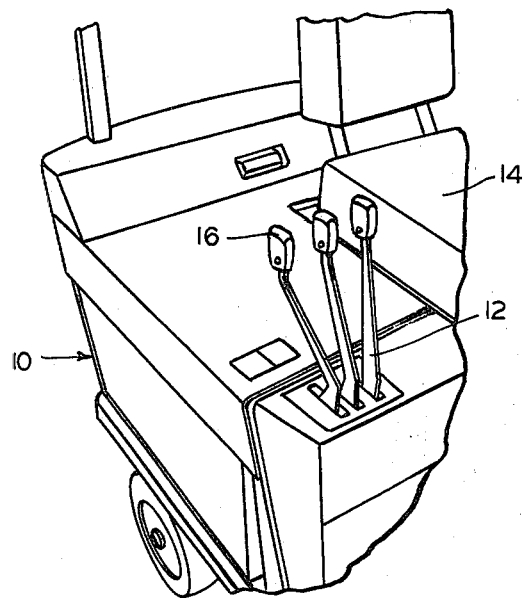
FIG. 1 is a perspective view of three control rods and handles mounted on a lift truck which utilize the present invention.

Referring now to the drawings, particularly to FIG. 1 a portion of a lift truck 10 is shown in perspective and utilizes the teachings of this invention. Three control rods 12 are located near the operator's seat 14 of the lift truck 10. Each of the control rods 12 at its extremity 18 is connected to a handle 16. Two of the control rods 12 are selectively manipulated to position an upright (not shown) and the other rod serves as a gear shift selector.

It should be noted that control rods 12 are shown in association with lift truck 10 for purposes of illustration only and that applications for this invention are not limited to lift trucks but include handles mountable on control rods for various different types of vehicles, equipment, machinery and the like which would be readily suggested to one skilled in the art after review of this disclosure.

Figure 2:
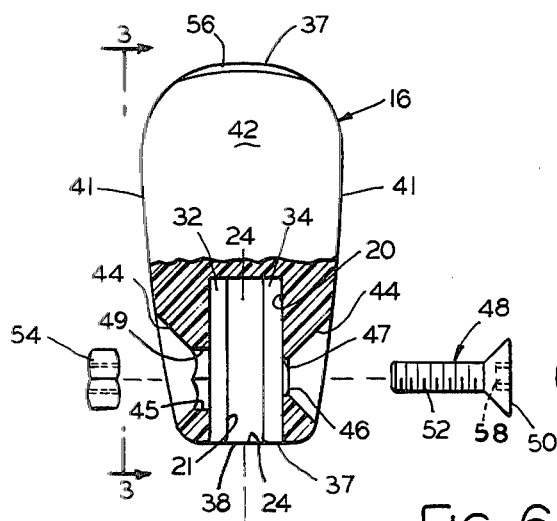
FIG. 2 is an assembly drawing illustrating the control rod and handle employing the present invention with portions in partial section for clarification.
Figure 3:
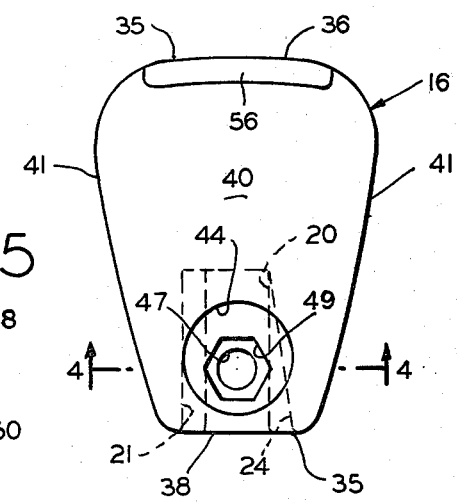
FIG. 3 is an elevational view of the handle in FIG. 1 looking in the direction of arrows 3—3 in FIG. 2.
Figure 6:
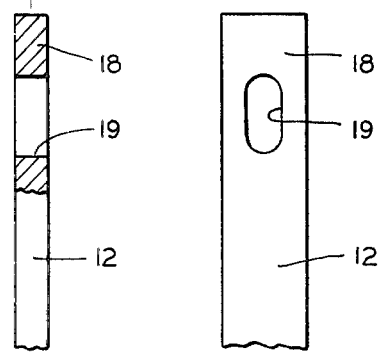
FIG. 6 is a detail elevational view of the outer extremity end of the control rod lever shown in FIG. 2.
Figures 4, 5:
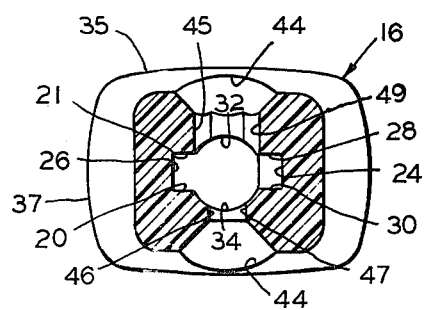
FIG. 4 is a cross-sectional view of the handle of FIG. 3 looking in the direction of arrows 4—4 in FIG. 3.
FIG. 5 is a detail view of the bolthead of the bolt shown in FIG. 2.

As shown in FIGS. 2-4, the handle 16 is in the form of an inverted frusto-pyramid with rounded edges shaped to naturally conform to the user's hand. The handle 16 includes parallel top and bottom rectangular bases 36 and 38, respectively. Each base 36 and 38, is bounded by a pair of parallel relatively longer base edges 35 and a pair of parallel relatively shorter base edges 37 perpendicular to base edges 35. Also included in handle 16 are two pairs of lateral faces 40 and 42 respectively, which connect top base 36 to bottom base 38. Each of the lateral faces of one of the pair of lateral faces 40 or 42, is substantially identical to the other and is in the form of a regular trapezoid. The top and bottom outer edges of lateral faces 40 are formed from top and bottom relatively longer base edges 35. Similarly, top and bottom outer edges of lateral faces 42 are top and bottom relatively shorter base edges 37. Each lateral face 40 is bounded on either side by a lateral face 42 joined at a lateral edge 41. Each of the four lateral edges 41 of handle 16 is of substantially the same length. Top and bottom base edges 35 and 37 and lateral edges 41 are preferably rounded for operator comfort.

In FIG. 2 the manner in which the handle 16 is mounted on the extremity 18 of control rod 12 is illustrated wherein the extremity 18 is inserted through the bottom base 38 into a longitudinal passageway or bore 20. the extremity 18 of control rod 12 has a rectangular configuration and is received in a slot 21 included in longitudinal bore 20 which also has rectangular cross-sectional configuration. When the extremity 18 is in the slot 21, it resists dislodgement from a twisting force due to the rectangular shape of both the extremity 18 and slot 21. The slot 21 includes a pair of spaced-apart side walls 28 and 30 connected together by spaced apart inwardly inclined end wall 24 and vertical end wall 26. Side walls 28 and 30 of slot 21 have respective outwardly curved mid-sections 32 and 34, see FIG. 4. Thus handle 16 can be mounted on a circular outer end of a control rod without modifying the longitudinal bore 20.

The lateral faces 40 and 42 of the handle 16 have a regular outer surface. A centrally located recessed opening 44 is provided in the regular surface of the lower portion of each lateral face 40. The recessed openings 44 form the two ends 45 and 47 of a transverse passageway or circular bore 46 in the handle 16 intersecting and perpendicular to longitudinal bore 20. An oval transverse opening 19 is provided at the extremity 18 of the control rod 12. When the extremity 18 of the control rod 12 is fully inserted in the longitudinal bore 20, the length of the longitudinal bore 20 is such that the transverse opening 14 is in alignment with the transverse bore 46 at the point of intersection between bores 20 and 46. At the end 45 of transverse bore 46 is a hexagonal nut holding outer surface 49. Obviously the transverse bore 46 does not have to pass through the lateral face 40 adjacent the nut holding surface 49 nor does a recess opening 44 have to be provided in the lateral face 40 unless a symmetrical appearance of handle 16 is desired.

A bolt 48 has a bolthead portion 50 at one end and an externally threaded portion 52 at the other end. Threaded end 50 of bolt 48 is insertable through transverse bore 46 and aligned transverse opening 19 starting at the end 47 of transverse bore 46 until bolthead 50 is in abutment with the end 47 of the transverse bore 46. The externally threaded outer end 52 of bolt 48 is capable of engagement with an internally threaded nut 54 which is held stationary when placed in hexagonal nut holding surface 49 in horizontal bore 46 to facilitate securing the handle 16 to the rod 12. The bolthead 50 has a tool engagement outer surface preferably in the form of a recessed hexagonal cavity 58. An Allen wrench (not shown) can be used to securely fasten the knob 16 to the outer end 18 of the control lever 12. Additionally the above-described nut and bolt arrangement can be retightened to take up play due to the wear of parts. The bolthead 50 and bolt threaded end 52 with associated nut 54 are located at or near recessed openings 44 and below the normal surface of the lateral faces 40 to avoid interference with the operator's manipulation of the knob 16.

The top base 36 of knob 16 may preferably contain instructional or operational indicia (not shown) protected by a clear plastic inset plate 56 forming the regular outer surface of top base 36.

Although only one embodiment of my invention has been described herein, this disclosure is merely for the purpose of illustration and not as a limitation of the scope of the invention. It is therefore to be expressly understood that the invention is not limited to the specific embodiment shown, but may be used in various other ways, and that various modifications may be made to suit the different requirements, and that other changes, substitutions, additions, and omissions may be made in the construction, arrangement, and manner of operation of the parts without necessarily departing from the scope of the invention as defined in the following claims.

What is claimed is:

1. A handle comprising:
   a body portion having two ends;
   a longitudinal passageway extending into one end of the body portion and adapted to receive an extremity of a rod;
   the rod having a transverse opening near the extremity;
   a transverse passageway in the body portion arranged to align with the transverse opening when the handle is mounted on the rod;
   the transverse passageway having a portion with a configuration which holds a nut from turning when engaged with the threaded end of a bolt which extends through the transverse opening in the rod and is threaded into the nut held by the portion to facilitate securing the handle to the end; and
   the longitudinal passageway being provided with generally rectangular portions and generally circular portions for receiving the extremity of the rod having either a generally rectangular or generally cylindrical configuration.

2. The handle as claimed in claim 1 wherein the handle has a regular outer surface and the transverse passageway has two ends and wherein at least one end of the transverse passageway is recessed in from the regular outer surface of the handle.

3. The handle as claimed in claim 1 wherein the body portion is generally in the form of an inverted frusto-pyramid and wherein the two ends are substantially parallel generally rectangular top and bottom bases, respectively.

4. The handle as claimed in claim 3 wherein the frusto-pyramid includes two pairs of spaced apart lateral faces, and wherein the lateral faces of each pair of faces are generally identical trapezoids, and wherein the frusto-pyramid includes base edges and lateral edges, wherein the transverse passage way is extending through at least one of the lateral faces of the one pair of lateral faces having longer top and bottom base edges than the other pair of trapezoid shaped lateral faces.

5. The handle as claimed in claim 4 wherein the lateral and base edges of the pyramid are rounded.

6. The handle as claimed in claim 5 wherein the top base includes a clear inset plate.

7. A handle assembly comprising:
   a body portion in the form of an inverted frusto-pyramid having substantially parallel generally rectangular top and bottom bases;
   a longitudinal passageway extending into the bottom base of the body portion and adapted to receive an extremity of a rod;
   said rod having a transverse opening near the extremity;
   a transverse passageway in the body portion arranged to align with said transverse opening when the handle is mounted on the rod;
   the body portion further having two pairs of spaced-apart lateral faces, the lateral faces of each pair of lateral faces are generally identical trapezoids, the body portion including base edges and lateral edges;
   the transverse passageway extending through at least one of the lateral faces of the one pair of lateral faces;
   means for selectively securing the handle to the rod; and
   the longitudinal passageway being provided with generally rectangular portions and generally circular portions for receiving the extremity of the rod having either a generally rectangular or generally cylindrical configuration.

8. The handle assembly as claimed in claim 7 wherein the securing means includes a bolt adapted for insertion into the transverse passageway and through the transverse opening, the bolt having an externally threaded end, and an internally threaded nut capable of mating engagement with the bolt.

9. The handle assembly as claimed in claim 8 wherein the bolt includes a bolthead having an outer surface that includes a recessed cavity having a polygonal configuration.

10. The handle assembly as claimed in claim 8 wherein the handle has a regular outer surface and the transverse passageway has two ends and wherein at least one end of the transverse passageway is recessed in from the regular outer surface of the handle.

11. The handle assembly as claimed in claim 7 wherein the one pair of lateral faces has longer top base edges than the top base edges of the other pair of lateral faces.

* * * * *

UNITED STATES PATENT AND TRADEMARK OFFICE
CERTIFICATE OF CORRECTION

PATENT NO. : 4,356,739

DATED : November 2, 1982

INVENTOR(S) : Warner K. Brown et al.

It is certified that error appears in the above-identified patent and that said Letters Patent is hereby corrected as shown below:

On the title page, inventors should read:

--(75) Inventors: Warner K. Brown; Robert L. Kirby; Louis A. Haddock, Jr. --.

Signed and Sealed this

Nineteenth Day of July 1983

[SEAL]

Attest:

GERALD J. MOSSINGHOFF

Attesting Officer

Commissioner of Patents and Trademarks